(12) United States Patent
Hisatomi et al.

(10) Patent No.: US 7,557,951 B2
(45) Date of Patent: Jul. 7, 2009

(54) IMAGE PROCESSOR AND IMAGE PRINTER

(75) Inventors: Kenji Hisatomi, Hirakata (JP);
Kazuyuki Murata, Kyotanabe (JP);
Hideyuki Kuwano, Hirakata (JP)

(73) Assignee: Panasonic Corporation, Osaka (JP)

( * ) Notice: Subject to any disclaimer, the term of this patent is extended or adjusted under 35 U.S.C. 154(b) by 979 days.

(21) Appl. No.: 10/507,080

(22) PCT Filed: Feb. 12, 2003

(86) PCT No.: PCT/JP03/01423

§ 371 (c)(1),
(2), (4) Date: Sep. 9, 2004

(87) PCT Pub. No.: WO03/077534

PCT Pub. Date: Sep. 18, 2003

(65) Prior Publication Data
US 2005/0151986 A1  Jul. 14, 2005

(30) Foreign Application Priority Data
Mar. 11, 2002 (JP) .............................. 2002-066041
Dec. 17, 2002 (JP) .............................. 2002-365779

(51) Int. Cl.
G06F 15/00 (2006.01)
G06K 1/00 (2006.01)
H04N 1/60 (2006.01)
G03F 3/08 (2006.01)

(52) U.S. Cl. ........................................ 358/1.9; 358/518
(58) Field of Classification Search .................. 358/1.1, 358/1.13, 1.14, 1.15, 1.9, 518, 519, 504
See application file for complete search history.

(56) References Cited

U.S. PATENT DOCUMENTS
6,091,518 A   7/2000 Anabuki (Continued)

FOREIGN PATENT DOCUMENTS
EP  1 156 409  11/2001

(Continued)

OTHER PUBLICATIONS

Supplementary European Search Report issued Mar. 7, 2008 in the European Application No. 03 70 5071 which is a counterpart to the present application.

(Continued)

Primary Examiner—Douglas Q Tran
(74) Attorney, Agent, or Firm—Wenderoth, Lind & Ponack, L.L.P.

(57) ABSTRACT

The description interpreting unit (101) identifies the format (the Exif, the JFIF and the like) of the image data which is included in the content which is received from the host equipment (10). The image data obtaining unit (103) obtains the image data which is linked to the content from the printing content buffer (102) or the external DB (119). The image judging unit (104) judges the type of the received image file, and notifies the result to the image rasterization unit (105). The image rasterization unit (105) extends the compressed image data. The image processing deciding unit (106) decides parameters for the image processing which is executed by the image processing unit (107). The rendering unit (108) converts the image data to be described by the CMYK color space in order to execute printing. And, the printing unit (109) executes printing.

4 Claims, 14 Drawing Sheets

U.S. PATENT DOCUMENTS

| | | | |
|---|---|---|---|
| 6,310,647 | B1 | 10/2001 | Parulski et al. |
| 6,493,028 | B1 | 12/2002 | Anderson et al. |
| 7,414,750 | B2 * | 8/2008 | Yoshida ...................... 358/1.9 |
| 7,443,539 | B2 * | 10/2008 | Komiya et al. ................ 358/1.9 |

FOREIGN PATENT DOCUMENTS

| | | |
|---|---|---|
| JP | 8-088779 | 4/1996 |
| JP | 8-088780 | 4/1996 |
| JP | 8-123939 | 5/1996 |
| JP | 9-238265 | 9/1997 |
| JP | 9-294214 | 11/1997 |
| JP | 10-093833 | 4/1998 |
| JP | 10-117290 | 5/1998 |
| JP | 10-171718 | 6/1998 |
| JP | 10-178534 | 6/1998 |
| JP | 10-224643 | 8/1998 |
| JP | 11-170634 | 6/1999 |
| JP | 11-196283 | 7/1999 |
| JP | 2000-227848 | 8/2000 |
| JP | 2000-341508 | 12/2000 |
| JP | 2001-103331 | 4/2001 |
| JP | 2001-189857 | 7/2001 |
| JP | 2001-298633 | 10/2001 |
| JP | 2002-057877 | 2/2002 |
| JP | 2002-176552 | 6/2002 |
| JP | 2003-060935 | 2/2003 |
| JP | 2003-143420 | 5/2003 |
| WO | 99/27470 | 6/1999 |

OTHER PUBLICATIONS

J. S. Houchin et al., "File format technology in JPEG 2000 enables flexible use of still and motion sequences", Signal Processing. Image Communication, Elsevier Science Publishers, Amsterdam, NL, vol. 17, No. 1, Jan. 2002, pp. 131-144, XP004326803, ISSN: 0923-5965.

"Digital still camera image file format standard (exchangeable image file format for digital still cameras: exif) version 2.1" [Online] Jun. 12, 1998, XP002224029, retrieved from the Internet: URL:www.pima.net/standards/it10/PIMA15740/Exif_2-1.PDF> [retrieved on Dec. 6, 2002].

Digital Imaging Group; "DIG35-Metadata for Digital Images" Internet Citation, [online] Mar. 6, 2000, XP001131278, Retrieved from the Internet: URL:HTTP://ALEXANDRIA.SDC.UCSB.EDU/{1HILL/draftstandard.pdf> [retrieved on Jan. 9, 2002].

International Preliminary Examination Report issued in PCT/JP2003/001423, Form PCT/IPEA/409, date of mailing Sep. 30, 2004.

* cited by examiner

FIG. 6A
```
<?xml version="1.0" encoding="EUC-JP"?>
<?xml -print="1.0"?>
<html>
<body>
<p>
News text can be read from here.
Drawing comes below.
</p>
<img src="exif.jpg">
<img src="jfif.jpg">
</body>
</html>
```
- 600
- 603 (<html>)
- 604 (<p>...)
- 601 (<img src="exif.jpg">)
- 602 (<img src="jfif.jpg">)
FIG. 6B
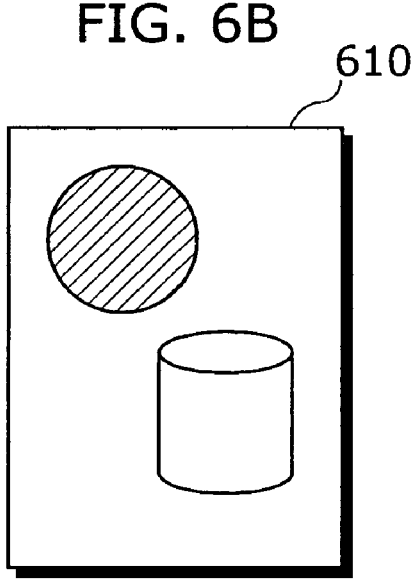
610
FIG. 6C
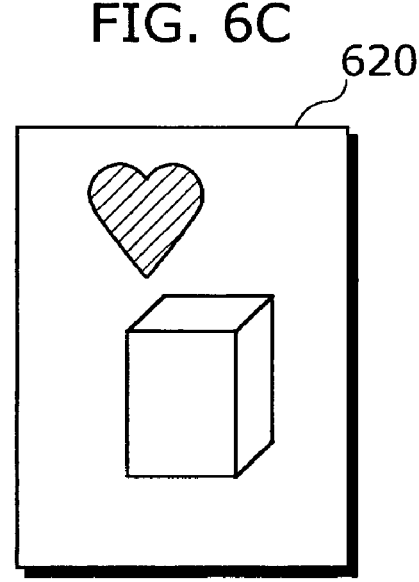
620

FIG. 9
News text can be read from here.
Drawing comes below.
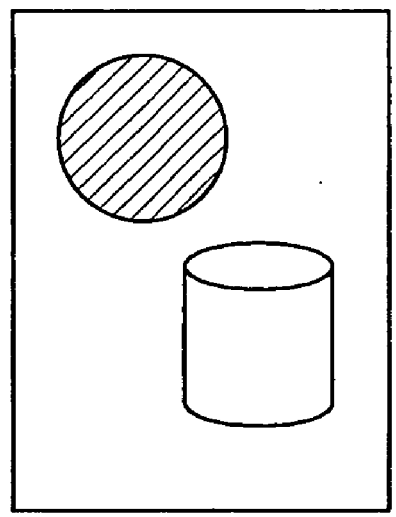
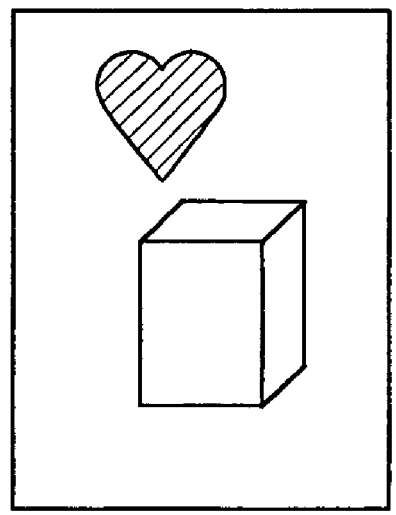

FIG. 11A

```
<?xml version="1.0" encoding="EUC-JP"?>
<?xml -print="1.0"?>
<html>
<head>
<META color space=NTSC></META>
</head>
<body>
<img src="sampl.jpg">
</body>
</html>
```

711 → `<head>`
712 → `</head>`
713 → `<META color space=NTSC></META>`
714 → `<img src="sampl.jpg">`
710 (container)

FIG. 11B

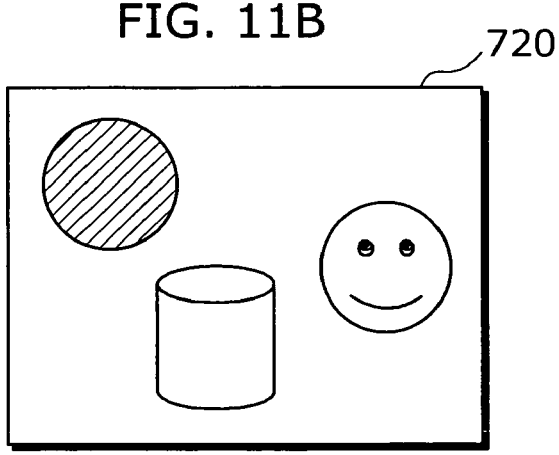

```
<?xml version="1.0" encoding="EUC-JP"?>
<?xml -print="1.0"?>
<html>
<body>
<img src="sampl.jpg">
<META color space=NTSC></META>
</body>
</html>
```

733 → `<img src="sampl.jpg">`
734
730

FIG. 14

| Image generation environment | Color space name |
|---|---|
| DSC | SRGB |
| Digital TV | NTSC |
| ⋮ | ⋮ |

```
<?xml version="1.0" encoding="EUC-JP"?>
<?xml -print="1.0"?>
<html>
<head>              811
<META img source=DSC></META>
</head>
<body>           812
<img src="sampl.jpg">
</body>
</html>
```
810

811
812

820

IMAGE PROCESSOR AND IMAGE PRINTER

TECHNICAL FIELD

The present invention relates to an image printing apparatus which executes printing based on image data, in particular, to an image processing apparatus or an image printing apparatus for executing printing, using image data which is generated by an electronic imaging apparatus such as a digital still camera, image data which is displayed by a digital TV and the like and image data which is distributed via a network and the methods thereof.

BACKGROUND ART

Recently, an apparatus which (i) photoelectrically converts a subject image which is formed by a taking lens into electric signals using an image sensor such as a charge-coupled device (CCD), (ii) performs a compression process for the electric signals by the Joint Photographic Experts Group (JPEG) method and the like and (iii) records the image data in a recording medium has been widely used. For example, there is a digital still camera (also called an electronic still camera) which comprises a card medium such as a PC card or "Smart-Media", an internal fixed memory and the like.

In the wake of this phenomenon, there has been a printer which reads out the image data which is generated by such digital still camera (described as "DSC" below) as described above and the like and two-dimensionally prints the image data in a printing medium such as paper.

Also, an AV equipment such as a TV or a DVD recorder which has a viewer function with which the image data taken by such DSC as described above can be seen and a browser function which displays information data such as a data broadcasting has been commercialized. And, the rasterization of a printer for printing such contents as described above from the AV equipment has been considered.

Normally, header information which accompanies the Exchangeable Image File Format (Exif) standard is added to the image data which is generated and compressed according to the JPEG standard by a conventional DSC and the like. The type of the employed DSC, photographic conditions in shooting and the like are described in the header information. Also, in the case where it is desired to record high quality data, the high quality data can be accumulated in a memory medium by a reversible and incompressible recording method (for example, the Tagged Image File Format (TIFF) method).

In the case where image data of the JPEG format which is generated by a DSC and the like is printed, the conventional image printing apparatus (for example, Japanese Laid-Open Application No. 2000-13718) executes each kind of image processing, that is, a rasterization process of compression data (called an extension or a decompression) and a color conversion process which performs a color correction and the like, based on the contents described in the header information, so that the inputted image data is printed in the optimum form.

By the way, as contents for printing, there is a content which is described in the Hyper Text Markup Language (HTML) format for the World Wide Web (WWW) and a content which is described in the Broadcast Markup Language (BML) format for a digital broadcasting, and both of the contents include image data of the JPEG format.

However, the image data which is included in such contents as described above is not limited to the image data which is generated by a DSC and the like. For example, there are image data which is read by a scanner and the like and image data whose format is changed from other image formats. Although such image data as described above is the image data of the same JPEG format, the header information of the Exif is not added to. And, among such contents as described above, there is a case where JPEG images of different data sources exist in the same content.

Moreover, the image data which is used by a DSC is generally created based on the color space called "sRGB". However, some of the image data is created by the color spaces of the National TV Standards Committee (NTSC) format, called "YIQ" or "adobeRGB". Also, like the BML, there is a case where the data which has been converted into the "YIQ" color space of the NTSC format is prepared on the assumption that the data is to be displayed on a TV screen from the very start. On the other hand, as a printer usually converts the color space of the image data into the Cyan-Magenta-Yellow-blacK (CMYK) space and executes printing, the color space conversion which converts the color space of the inputted image data into the color space for printing is necessary.

If such mixed contents as described above are printed by the conventional printer, the image processing is executed uniquely treating all of the image data which is included in the contents as the image data which is created by a DSC and the like. Thus, the conversion of the color space and the image processing are also executed to the image data of the same JPEG format which is read out by a scanner and the like whose specific standards are different, as if the image data was read by a DSC.

Furthermore, conventionally, in the case where a printing of high quality is executed solving such situation as described above, a user needs to preview the outcome of the printing using a computer and adjust the specific parameters for the color space conversion. Thereby, it is complicated.

The first object of the present invention, in view of such problem as described above, is to provide an image printing apparatus and the like which can print each image well even in the case where a plurality of images of different formats and the like are mixed in one content for printing. Furthermore, the second object of the present invention is to provide an image printing apparatus and the like which can execute a good printing without user's specific directions.

DISCLOSURE OF INVENTION

In order to achieve such objects as described above, the image processing apparatus according to the present invention executes an image processing for given image data, comprising: an image obtaining unit operable to obtain at least one or more image data; a format judging unit operable to judge a format which specifies a storage format of the image data for each of said obtained image data; and an image processing unit operable to execute a predetermined image processing for the image data based on the judged format.

Thus, even if image data of different formats exists in a printing content, an image processing for always executing an optimum printing of good quality for each image data is possible. In other words, by using the image printing apparatus according to the present invention, even in the case where different kinds of image files exist in one printing content, a printing of good quality according to the situation of each image file is possible.

Also, in order to achieve such objects as described above, the image printing apparatus according to the present invention executes printing based on given image data, comprising: an image obtaining unit operable to obtain at least one or more image data; a format judging unit operable to judge a format for each of said obtained image data; an image processing unit operable to execute a predetermined image processing for the image data based on the judged format; and a printing unit operable to execute printing in a predetermined printing medium based on the image data which said image processing has been executed to.

Thus, even if image data of different formats exists in a printing content, an optimum printing of good quality can be always executed for each image data.

Moreover, in order to achieve such objects as described above, the image processing apparatus according to the present invention executes an image processing for given image data, and outputs the image data to a specific apparatus, the image processing apparatus comprising: an image obtaining unit operable to obtain information indicating a color space and at least one or more image data which is defined according to the color space; a color space specifying unit operable to specify a color space according to the specific apparatus; and a color space conversion unit operable to convert the obtained image data so that the data is defined according to the specified color space.

Thus, the color space of each image data which is included in the printing content is certainly transmitted to the printer via the color space information. Thereby, the conversion of the color space can be certainly executed. Even if image data has various kinds of color spaces, a printed matter which has a color space similar to the color space that a content provider intended can be obtained. In other words, by using the image printing apparatus according to the present invention, the color space of each image data which is included in the printing content is certainly transmitted to the printer via the color space information; the conversion of the color space can be certainly executed; and even if image data has various kinds of color spaces, a printed matter which has a color space similar to the color space that a content provider intended can be obtained.

Furthermore, in order to achieve such objects as described above, the image printing apparatus according to the present invention executes printing based on given image data, the apparatus comprising: an image obtaining unit operable to obtain information indicating a color space and at least one or more image data which is defined according to the color space; a color space specifying unit operable to specify a color space according to the image printing apparatus; a color space conversion unit operable to convert the obtained image data so that the data is defined according to the specified color space; and a printing unit operable to execute printing in a predetermined printing medium based on the image data which said color space conversion has been executed to.

Thus, the color space of each image data which is included in the printing content is certainly transmitted to the printer via the color space information. Thereby, the conversion of the color space can be certainly executed. Even if image data has various kinds of color spaces, a printed matter which has a color space similar to the color space that a content provider intended can be obtained.

In addition, in order to achieve such objects as described above, the image processing apparatus according to the present invention executes an image processing for given image data and outputs the image data to a specific apparatus, the image processing apparatus comprising: an image obtaining unit operable to obtain at least one or more image data and information which indicates an apparatus which has generated the image data; a color space estimating unit operable to estimate a color space according to the image data based on the information which indicates an apparatus which has generated the image data; a color space specifying unit operable to specify a color space according to the specific apparatus; and a color space conversion unit operable to convert the obtained image data so that a definition according to the estimated color space becomes a definition according to the specified color space.

Thus, even in the case where the color space of the image which is included in the obtained printing content is not known, based on the information which indicates where the image object is generated, the color space of the environment where the printing content is generated is estimated. And, according to the estimated color space, the data is converted into the color space of the printer. Thus, an image processing for obtaining a printed matter which has a similar color space to the color space a printing content provider intended is possible. In other words, by using the image printing apparatus according to the present invention, even in the case where the color space of the image which is included in the obtained printing content is not known, based on the information which indicates where the image object is generated, the color space of the environment where the printing content is generated is estimated; according to the estimated color space, the data is converted into the color space of the printer; and a printed matter which has a similar color space to the color space a printing content provider intended can be obtained.

Also, in order to achieve such objects as described above, the image printing apparatus according to the present invention executes printing based on given image data, the apparatus comprising: an image obtaining unit operable to obtain at least one or more image data and information which indicates an apparatus which has generated the image data; a color space estimating unit operable to estimate a color space according to the image data based on the information which indicates an apparatus which has generated the image data; a color space specifying unit operable to specify a color space according to the image printing apparatus; and a color space conversion unit operable to convert the obtained image data so that a definition according to the estimated color space becomes a definition according to the specified color space.

Thus, even in the case where the color space of the image which is included in the obtained printing content is not known, based on the information which indicates where the image object is generated, the color space of the environment where the printing content is generated is estimated. And, according to the estimated color space, the data is converted into the color space of the printer. Thereby, a printed matter which has a similar color space to the color space a printing content provider intended can be obtained.

In order to achieve such objects as described above, the present invention can be realized as an image processing method or an image printing method which comprises, as steps, the characteristic units of the image processing apparatus or image printing apparatus, and a program which includes all of the steps. And, the program can not only be stored in the ROM included in the apparatus and the like, but also be distributed via a recording medium such as a CD-ROM and a transmission medium such as a communication network.

BRIEF DESCRIPTION OF DRAWINGS

FIG. 6A is an example of a head file of a printing content which is described by the extensible Hyper Text Markup Language (XHTML)-Print format;

FIG. 6B is an image file example which is linked to the file as shown in FIG. 6A;

FIG. 6C is an image file example which is linked to the file as shown in FIG. 6A;

FIG. 9 is a schematic diagram showing the structure of a printing content file described by the XHTML-Print format which is inputted into the printer as shown in FIG. 8;

FIG. 11A is a diagram showing an example of the printing content structure according to the second embodiment;

FIG. 11B is an example of the image file which is linked to the file as shown in FIG. 11A;

FIG. 12 is an example of the case where color space information is described in other parts than the header part;

FIG. 14 is an example of the table which is used in the case where the color space of the obtained printing content is estimated;

BEST MODE FOR CARRY OUT THE INVENTION

The embodiments according to the present invention will be explained as following.

First Embodiment

Figure 1:
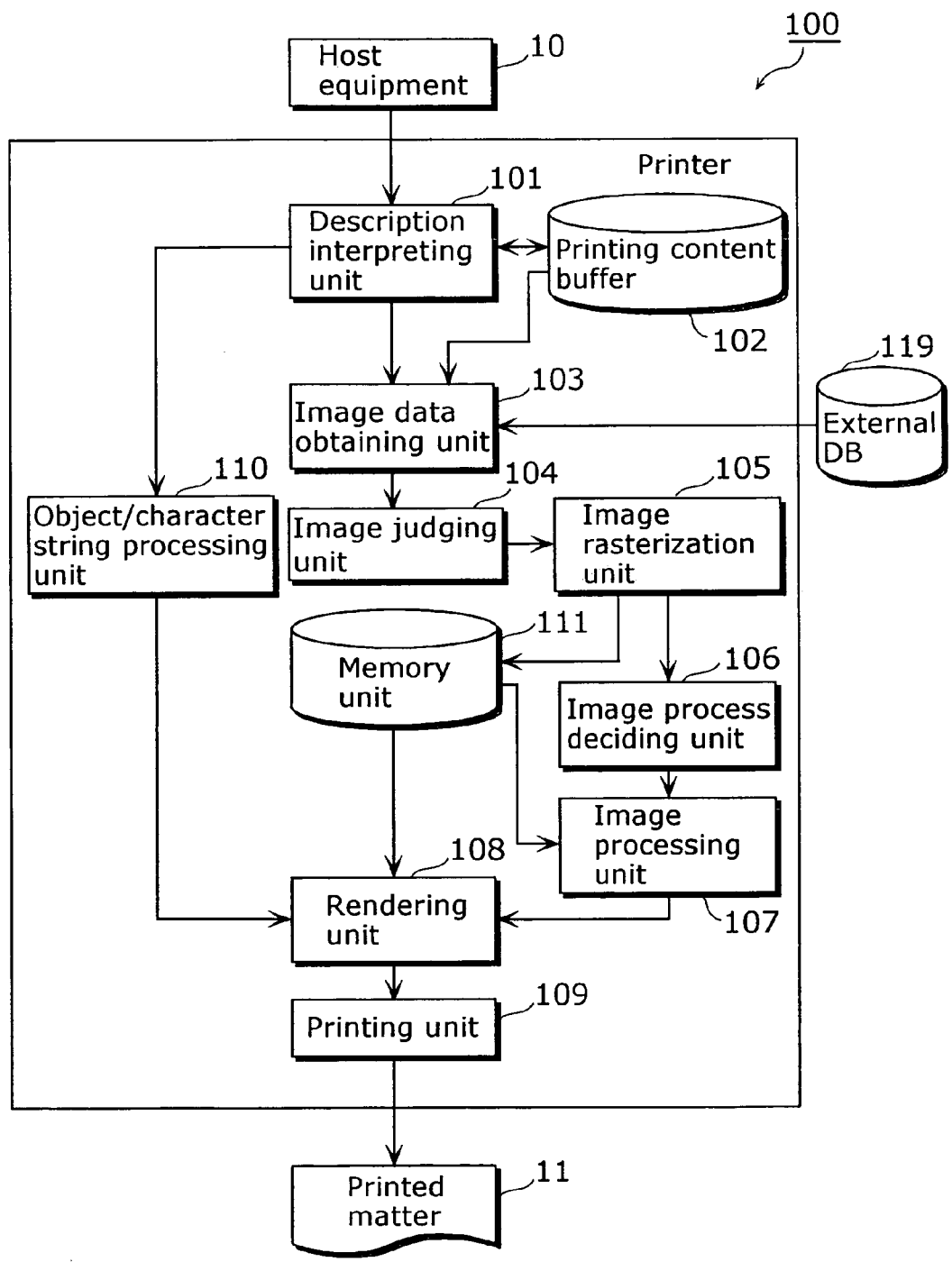
FIG. 1 is a block diagram showing a functional structure of a printer according to the first embodiment.

FIG. 1 is a block diagram showing the functional structure of a printer 100 according to the first embodiment. The printer 100 executes an appropriate image processing based on the format of the image data (for example, the JPEG image) which is included in the printing content received from a host equipment 10, and executes printing using the image data after the image processing. Here, the "printing content" means the content for printing. The printing content is described by the language system called the XHTML-Print which is one of the description languages of the extensible Markup Language (XML) type.

As shown in FIG. 1, the printer 100 includes a description interpreting unit 101, a printing content buffer 102, an image data obtaining unit 103, an image judging unit 104, an image rasterization unit 105, an image processing deciding unit 106, an image processing unit 107, a rendering unit 108, a printing unit 109 and an object/character string processing unit 110.

The description interpreting unit 101 includes a CPU, a ROM and the like, and controls the whole printer 100. Also, the description interpreting unit 101 stores the printing content which is received from the host equipment 10 (for example, a digital TV or a Set Top Box (STB)) in the content buffer 102.

In addition, the description interpreting unit 101 interprets the contents of the image data file or the Cascading Style Sheet (CSS) file which are described in the printing content, and creates the layout of each object according to the content. Then, the description interpreting unit 101 creates layout information (which includes linked information of the files) indicating the result, and notifies the layout information to the image data obtaining unit 103. Here, the "object" means a bunch of data such as a graph and a diagram which are displayed on the application. Also, the "layout" means to decide, when printing, in which position and at what size each object should be printed.

Furthermore, in the case where the size of each object is not known, depending on the description of the XHTML-Print format or the content described in the CSS file, the description interpreting unit 101 judges the size of each object by actually reading in the linked file.

The printing content buffer 102 temporarily holds the printing content by the direction of the description interpreting unit 101. In some cases, all of these contents are buffered, in advance, in the printing content buffer 102. In other cases, only the necessary data for each content is buffered, when necessary, in the printing content buffer 102.

The image data obtaining unit 103 extracts the corresponding image file in the printing contents which are buffered in the printing content buffer 102, based on the linked information which is included in the layout information which is notified from the description interpreting unit 101, and transmits the image file to the image judging unit 104. In the case where the linked image file exists in the external DB 119 other than the printing content buffer 102, the image data obtaining unit 103 obtains the image file from the external DB119, and transmits the image file to the image judging unit 104.

The image judging unit 104 judges the type of the image file which is received from the image data obtaining unit 103, and notifies the result to the image rasterization unit 105. As specific judging methods in such case as described above, there are a judging method with an extension of the image file, a judging method with header information of the image file and a judging method from the list itself of the image file data. In general, for an extension of the JPEG image file which is coded based on the JPEG standard which is one of the irreversible coding (lossy coding) methods, ".JPG", ".JPEG" (including the case where each extension has small letters) and the like are often used. And, for an extension of the Graphic Interchange Format (GIF) file which is coded by the GIF method which is one of the irreversible coding (lossless coding) methods, the extension such as "GIF" is often used. Moreover, the image file based on the JPEG2000 standard can be judged based on the extension such as ".j2k", ".jp2" and ".jpx" (including the case where each extension has big letters).

Thus, the image judging unit 104 judges the type of the image file based on such extensions as described above. Furthermore, even in the case where the size of the object cannot be defined by the description interpreting unit 101, the image judging unit 104 defines the size of the object based on the size of each file which is described in the header of individual image file.

Here, the judging method for each type of image file by the image judging unit 104 will be explained using an example of the JPEG image file. All of the following JPEG image files are called "baseline JPEG".

In general, the JPEG standard defines the compression method for the image data, but it does not define how to store the image data as a file. As a format standard of a file for holding the JPEG image data, there are generally the JPEG File Interchange Format (JFIF) which is applied to the data file used by a computer and the like and the Exchangeable image file format (Exif) for Digital Still Camera which is applied to the format of the image file which is mainly used by a DSC. Also, there are JPEG image files which are created by converting other standard formats.

The image rasterization unit 105 extracts (extends) the YCC image data from the JPEG image file based on the judgment result which is notified by the image judging unit 104, and generates bit map data. The YCC image data is a Ysignal and two color-difference signals which can be obtained by converting RGB data. Thus, the RGB image data can be obtained by inversing the YCC image data. Moreover, the image rasterization unit 105 stores the generated bit map data in the memory unit 111.

The image processing deciding unit 106 decides the method of the image processing to be executed to the bit map data which is rasterized by the image rasterization unit 105. An example of the image processing method in such case as described above will be raised as following. A case where the rasterized bit map data is read out from the memory unit 111, and an image processing (for example, a color correction process and the like) is executed to the bit map data is assumed. The JPEG image data which is recorded by a DSC is generally recorded based on the Exif format. In such case as described above, according to the Exif format, sometimes the parameters for shooting such as the type of the CCD (for example, a complimentary color type, a primary color type, and the like) which is used by the DSC, the type of the light source such as whether or not there is a strobo light emission and the exposure time are recorded. Thus, in the case of the Exif format, a direction is predetermined to the image processing unit 107 so that the image processing is executed taking such parameters for shooting into account. On the other hand, in the case of the JFIF format, specific parameters such as the Exif format are not specified. Therefore, the image processing deciding unit 106 gives a direction to the image processing unit 107 so that the image processing is executed using the predetermined default parameters.

The image processing unit 107 executes an image processing for the bit map data based on the direction of the image processing deciding unit 106. The JPEG is a method which is designed for compressing a full color image or gray scale image of the nature (the real landscape and the like). And, it is an optimum compression method in the case where an artwork which depicts the nature such as a picture or a similar material is processed. Thus, the image processing assumes such images as described above.

In the case where the object/character string processing unit 110 is judged, by the description interpreting unit 101, as the file other than the JPEG image file (such files as described above are a diagram object such as a line or a rectangle or an object such as an animation image or a character string), each object is converted into bit map data, in addition to a series of processes for the JPEG image file.

The rendering unit 108 combines the object which is two-dimensionally imaged after being converted into the bit map data by the object/character string processing unit 110, the bit map data which is rasterized by the image rasterization unit 105 and the bit map data which is processed by the image processing unit 107. And, the rendering unit 108 converts such combined data as described above into the image data which is described by the CMYK color space in order to execute a printing. Although some printers print the RGB data as it is, such CMYK conversion as described above is not executed in this case.

The printing unit 109 performs printing, in a medium such as paper, the printing data such as the CMYK image data which is converted by the rendering unit.

Figure 2:
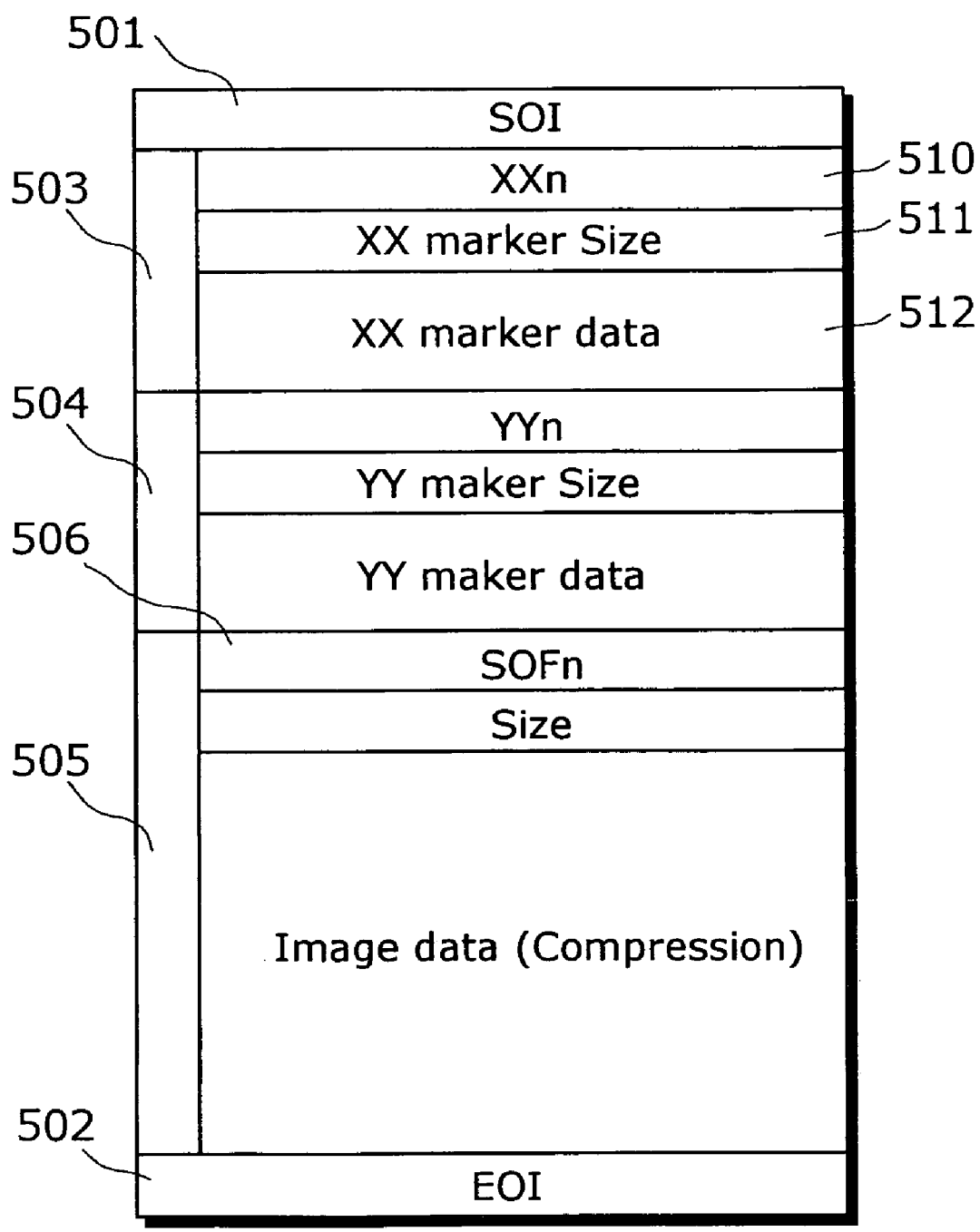
FIG. 2 is an example of a schematic diagram showing a structure of a JPEG image file.

Here, the structure (format) of the JPEG image file according to the first embodiment will be explained in reference to FIG. 2. FIG. 2 is an example of a schematic diagram showing the structure of the JPEG image file. As shown in FIG. 2, in the JPEG image file, the boundary of one file can be identified by a predetermined Start Of Image (SOI) marker 501 which indicates the starting point of a file and a predetermined End Of Image (EOI) marker 502 which indicates the ending point of a file. The code of the marker according to the JPEG standard is formed by a total of two bytes: the hexadecimal notation, "0xFF" (the hexadecimal numbers will be described as "0x" below) and the continuing number of one byte. According to the JPEG standard, the SOI marker 501 is described as "0xFFD8", and the EOI marker 502 is described as "0xFFD9".

After the SOI marker 501, for example, the marker 503 which indicates the type of encryption and the marker 504 which indicates the encryption parameters such as a quantization table continue. The inside of these markers is formed by the marker code 510 of 2 bytes, the size 511 of the marker which is described by 2 bytes and the marker data 512. The value of the size 511 of the marker is an addition of the number of bytes of the data 512 of the marker and 2 bytes which is the number of bytes of the size 511 of the marker. After such markers as described above, the data unit 505 which starts at the Start Of Frame (SOFn) marker 506 continues. The SOFn marker 506 is inserted into the head of a frame, and specifies an algorithm for coding and the like. Here, the "frame" describes the image information of the first floor layer. As the image data of the JPEG (baseline JPEG) which is generally used has one image per one frame, one JPEG image file has one frame header.

Figure 3:
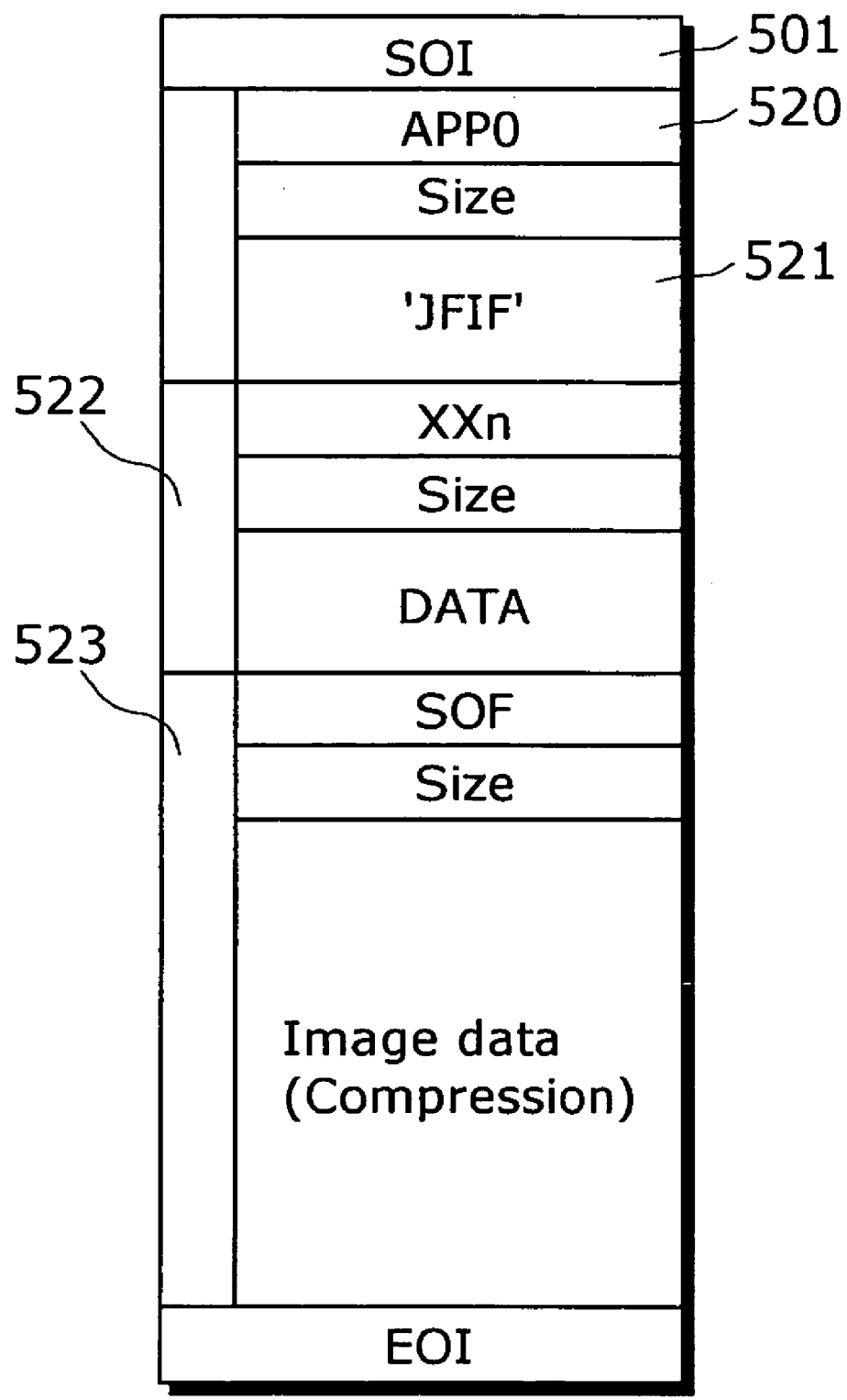
FIG. 3 is an example of a data structure of a JPEG image file based on the JPEG File Interchange Format (JFIF)

FIG. 3 is an example of a data structure of the JPEG image file, based on the JFIF, which is created by converting the data format of a computer and the like. In the case of the data which is based on the JFIF, after the SOI marker 501, APP0 marker 520 (0xFFE0) appears. In the data unit 521, the data 521 which starts with the character code called the "JFIF" (0x41, 0x46, 0x49, 0x46, 0x00) is recorded. Next, the marker 522 which has the data of the necessary parameters such as a quantization table to use for decoding and a Huffman table is described, and continues to the frame data unit 523. Thus, in the case of a file which is based on the JFIF, identification is possible based on whether or not the APP0 marker 520 exists, continuing after the SOI marker 501.

Figure 4:
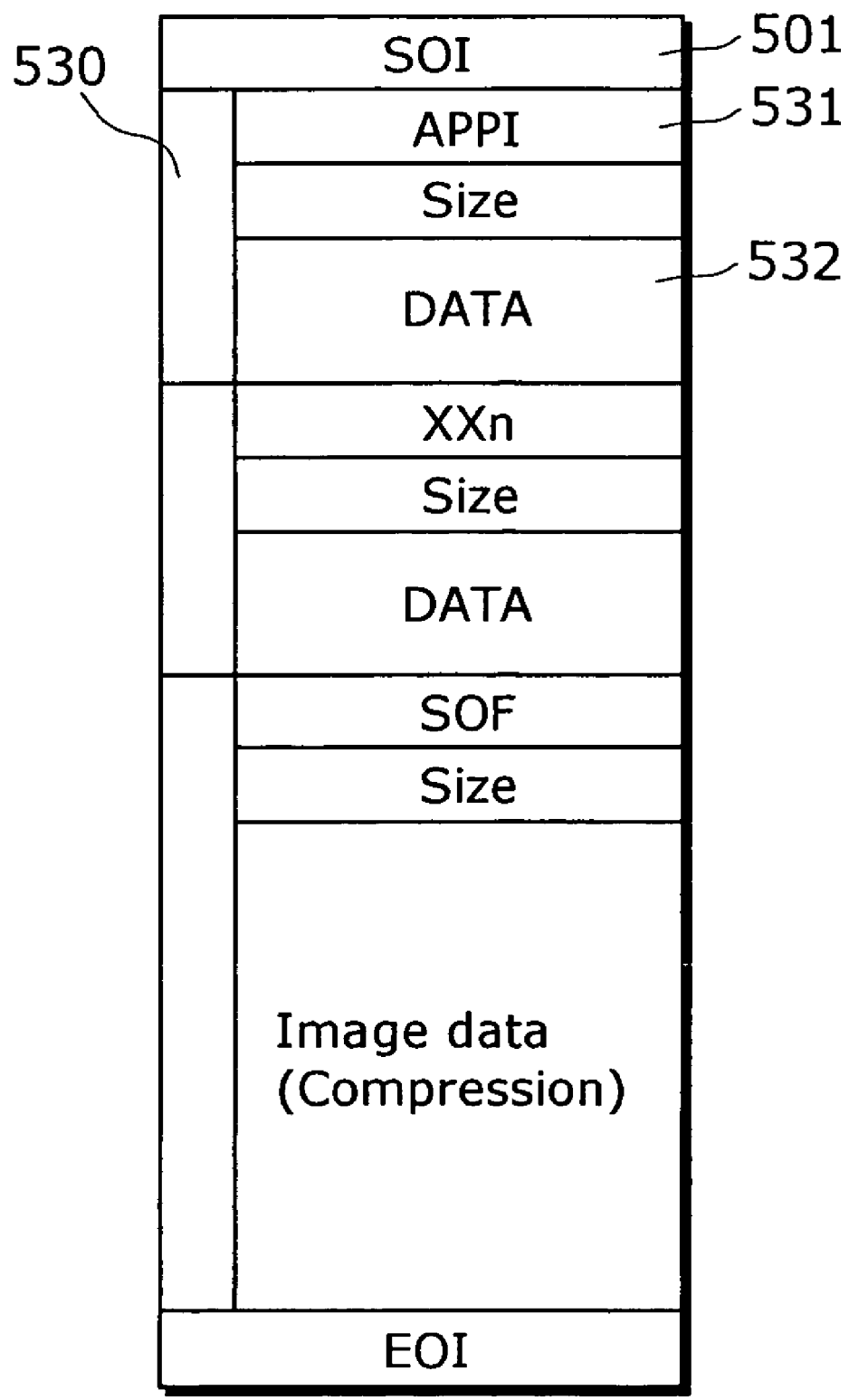
FIG. 4 is an example of a data structure of a JPEG image file based on the Exif.
Figure 5:
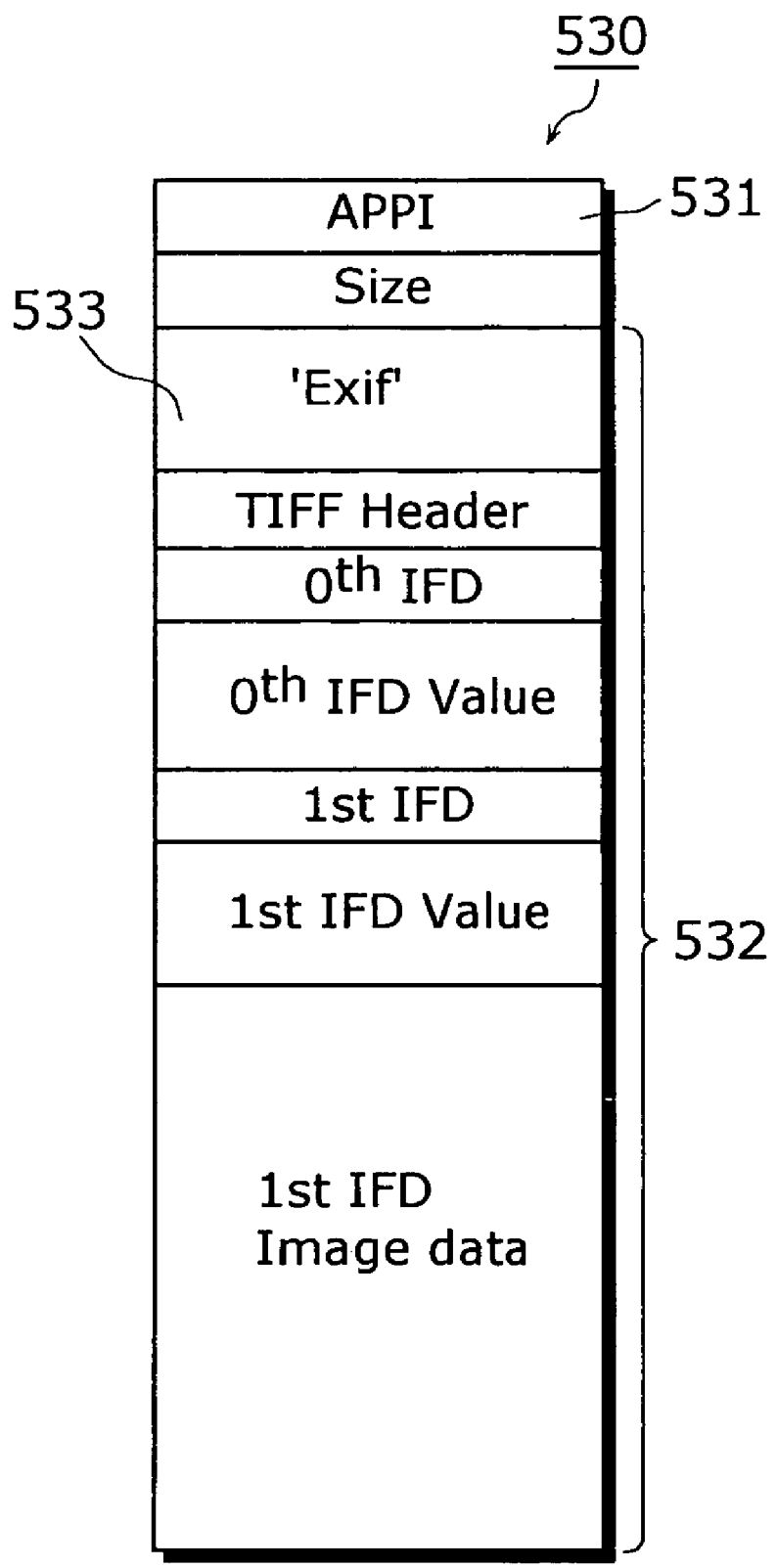
FIG. 5 is a data structure example of a segment which starts with APP1 marker.

FIG. 4 is an example of the data structure of a JPEG image file, based on the Exif, which is created by a DSC and the like. In the case of data based on the Exif, APP1 marker 530 (0xFFE1) appears following the SOI marker 501. This segment which starts at the APP1 marker 530 has a data structure as shown in FIG. 5. In the DATA 531, the data 532 which starts with the character code called the "Exif" (0x45, 0x78, 0x69, 0x66, 0x00, 0x00) is recorded at the beginning. Thus, identification is possible as to whether or not it is a file based on the Exif by checking the existence and non-existence of the APP1 marker 531 following the SOI marker 501.

As described above, the image judging unit 104 judges whether a file is based on the JFIF or the Exif by reading in the marker which follows the SOI marker 501 of the inputted JPEG image file and its head data.

Next, the operations of the printer 100 according to the first embodiment will be explained in reference to FIG. 6 to FIG. 9. The printer 100, as described above, obtains the printing content which is described in the Broadcast Markup Language (BML) and the Markup Language (ML) such as the XHTML-Print from an equipment such as an STB which receives a digital broadcasting, and interprets the content described in the ML. Then, the printer 100 executes printing by rendering the interpreted content into a two-dimensional image along with the image data which is included in the printing content. A case where a printing content which is described in the XHTML-Print format is received from the STB is assumed and will be explained as following.

FIG. 6A-FIG. 6C are diagrams showing an example of the printing content which is described in the XHTML-Print format. In the head file (the file name is "honbun.xml") as shown in FIG. 6A, each component is described as a unit of an object in the XHTML-Print format. And, for each object, parameters such as size, color and relative position/absolute position are specified. These parameters may be defined by the file which indicates a style attribute called the Cascading Style Sheets (CSS). Moreover, each object is described in the link format, and it may exist as another file. FIG. 6B and FIG. 6C are two image files 610 (the file name is "exif. jpg") and 620 (the file name is "jfif. jpg") which are linked to the file as shown in FIG. 6A. Although a file which indicates an attribute of each object may exist, depending on the printing content, the explanation will be omitted here.

Figure 7:
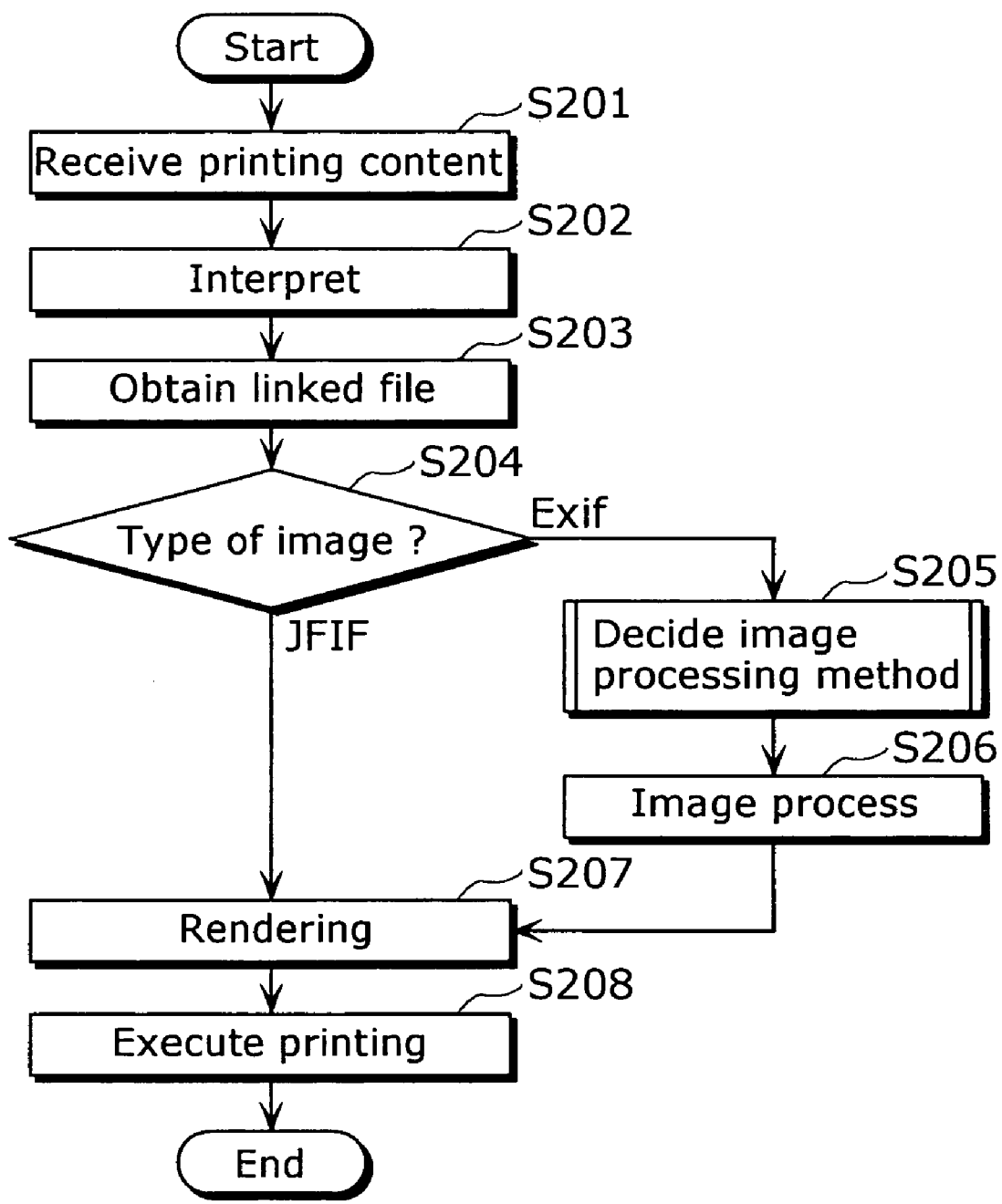
FIG. 7 is a flow chart showing the flow of processes executed by a printer.

FIG. 7 is a flow chart showing a flow of the processes of the printer 100.

First, the description interpreting unit 101 receives a printing content which is described in the XHTML-Print format from a host equipment 10 (for example, an STB), and stores the printing content in the printing content buffer 102 (S201).

Next, the description interpreting unit 101 interprets the description content of the "Honbun. xml" which is a head file of the printing content, and specifies a linked image file and the like. In such case as described above, as shown in FIG. 6A, as the part which is surrounded by "tag<p>601" and "tag</p>602" is a character string, the fact that the part is a character string is notified to the "object/character string processing unit 110".

Moreover, the description interpreting unit 101 interprets that the part which is described as "img src=" in the file "honbun. xml" indicates linked files (in FIG. 6A two image files such as the "exif. jpg" and the "jfif. jpg" are linked). After that, the image data obtaining unit 103 obtains the linked image files from the printing content buffer 102 or the external DB119 (S203). The obtained image files are transmitted to the image judging unit 104.

After that, the image judging unit 104 judges the type of the obtained image file (S204). The two image files as described above can be judged as the JPEG image files from the extensions. Furthermore, in the case of the JPEG image file, as described above, whether it is data based on the JFIF or data based on the Exif is judged by checking the data of the application marker which follows the SOI marker.

If the delimiter which follows the SOI marker is the APP1 marker, and the data includes a character string called the "Exif" (S204: Exif), the JPEG image file is judged as based on the Exif standard, and transmitted from the image rasterization unit 105 to the image processing deciding unit 106. And, the image processing method is selected based on the apparatus information, the photographic information and the like (described as "apparatus information and the like" below) which are described within the application segment of the type 1. The example of FIG. 6B corresponds to such case as described above. Then, the image processing unit 107 transmits the bit map image data which is image processed by the selected and specified image processing method to the rendering unit 108.

On the other hand, if the delimiter following the SOI marker is an APP0 marker (5204: JFIF), the JPEG image file is judged as the file based on the JFIF standard, and directly transmitted from the image rasterization unit 105 to the process of the rendering unit 108. The example of FIG. 6C corresponds to such example as described above.

After that, the rendering unit 108 combines all of such data as described above (S207), and executes an image processing for each object (S205, S206). Thus, the printing unit 109, as shown in FIG. 9, executes printing on a printing medium such as paper (S208).

According to the first embodiment, the case where the JPEG image file has the Exif format and the JFIF format is described. As other examples, in the case where the image file which is sent to the image judging unit 104 is a graphic image of the Portable Network Graphics (PNG) format or the Graphic Interchange Format (GIF) which has an extension such as ".png" or ".gif", the printer can be formed so that the image processing deciding unit 106 selects the image processing method which is suitable for the graphic image.

Figure 8:
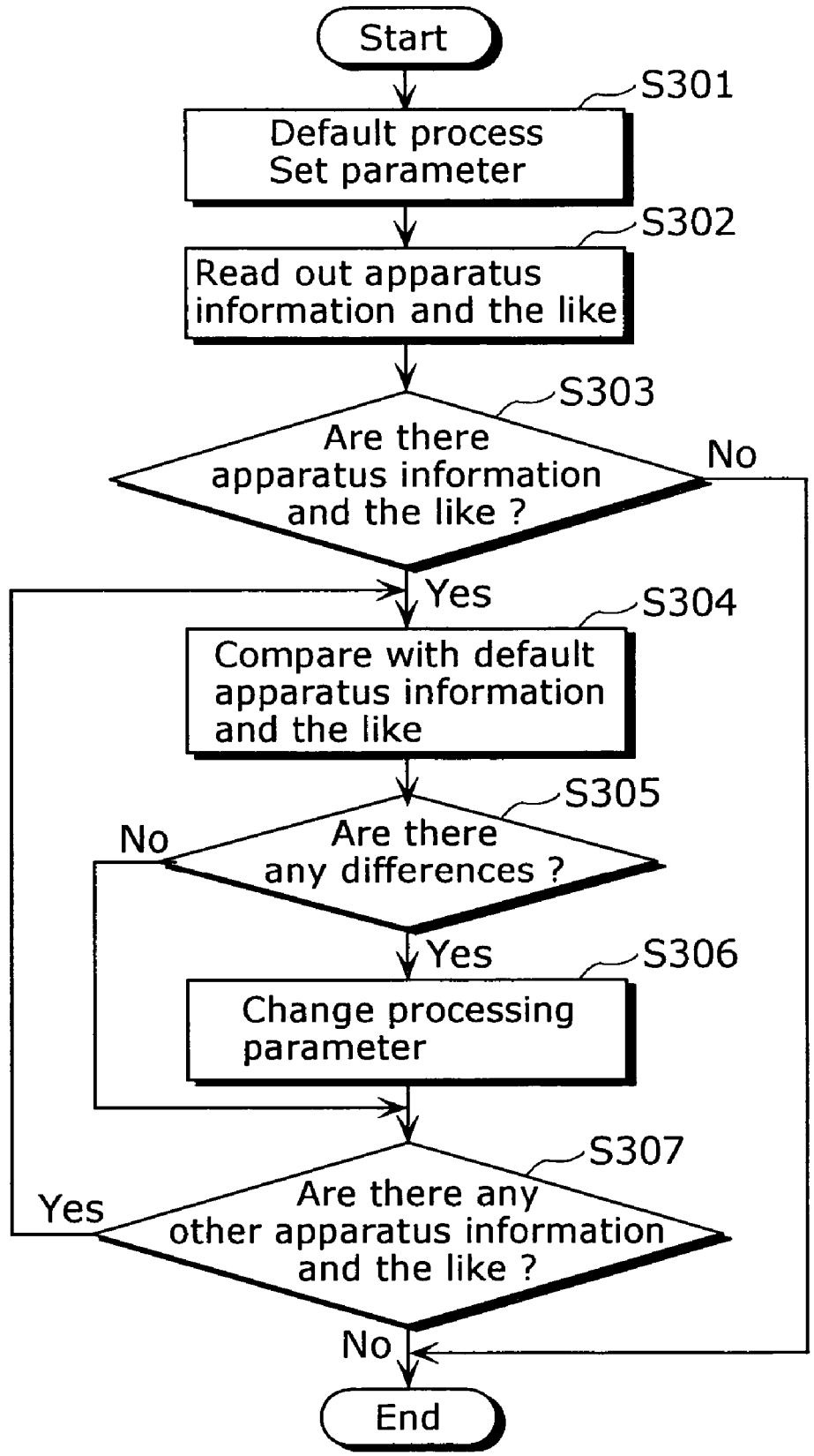
FIG. 8 is a specific flow chart showing the flow of the "image processing method deciding" process as shown in FIG. 7.

FIG. 8 is a specific flow chart of the "image processing method deciding (S205)" process as shown in FIG. 7 as described above.

First, the image processing deciding unit 106 reads out (S301) the default parameters for deciding the image processing which are memorized inside (described as "process parameters" below), and reads out (S302) the apparatus information and the like which are described in the image data received from the image rasterization unit 105.

Furthermore, the image processing deciding unit 106 compares the default apparatus information and the like with the read-out apparatus information and the like (S304). In the case where there is a difference (S305: Yes), the values of the process parameters are changed, and the process parameters are notified to the image processing unit 107. Such processes as described above are repeated for all of the apparatus information and the like (S304-S307).

As described above, using the printer according to the first embodiment, the image printing apparatus which can execute an appropriate image processing for printing, based on the format of the image data which is included in the received printing content, can be realized.

Second Embodiment

According to the first embodiment, the printer which executes an appropriate image processing, based on the format of the image data which is included in the received printing content, and prints an image after the appropriate image processing is explained. According to the second embodiment, a printer which receives information (described as "color space information" below) indicating a color space of an image according to image data, executes an image processing, based on the color space information, and prints an image after the image processing will be explained.

Here, the "color space" means a three-dimensional (for example, RGB) or four-dimensional (for example, CMYK) coordinate system for indicating colors. The color space has various definitions. The "NTSC color space (,that is, the YIQ color space)" is generally used for a TV receiving set and the like. And, the "sRGB color space" is generally used for a DSC. Also, in the case of a printing apparatus, color spaces such as the "adobeRGB color space" or the "AppleRGB color space" are used as well. Each color space has a subtly different range of colors to be displayed. The JPEG standard does not have any specifications for the color space. If an image is shot by a DSC, the color space can be supposed as the "sRGB". However, in the case of a JPEG file, it is difficult to judge what kind of color space the data is created by.

Figure 10:
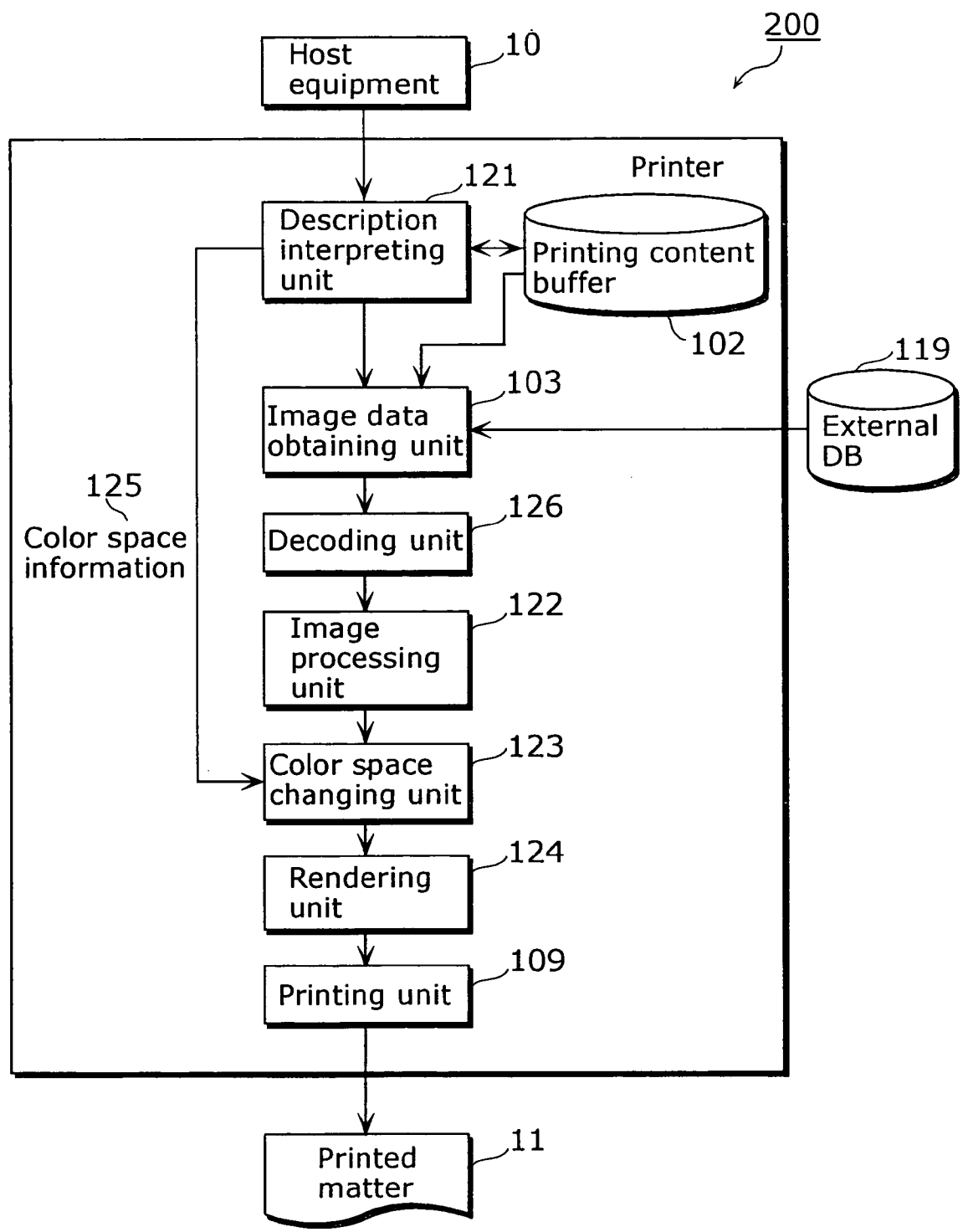
FIG. 10 is a block diagram showing the functional structure of the printer according to the second embodiment.

FIG. 10 is a block diagram showing a functional structure of a printer 200 according to the second embodiment. According to the second embodiment, as well as the first embodiment, a case where printing is executed using the image data which is described in the XHTML-Print format in the printing content is assumed.

As shown in FIG. 10, the printer 200 comprises a description interpreting unit 121, a printing content buffer 102, an image data obtaining unit 103, a decoding unit 126, an image processing unit 122, a color space changing unit 123, a rendering unit 124 and a printing unit 109. The explanation for the same structures as the first embodiment will be simplified below, and the different structures will be mainly explained.

The description interpreting unit 121 includes a CPU, a ROM and the like, and controls the whole printer 200. Moreover, the description interpreting unit 121 stores a printing content which is received from a host equipment 10 in the printing content buffer 102. And, the description interpreting unit 121 identifies the color space of the image which is included in (or linked to) the printing content, and notifies the color space information to the color space changing unit 123. Here, the description interpreting unit 121 identifies the color space based on the content which is described in the image file included in the printing content. Furthermore, the description interpreting unit 121 controls so that the image data obtaining unit 103, the decoding unit 126 and the image processing unit 122 are omitted in the case where (i) linked image data does not exist or (ii) the image data is not compressed and decoding is unnecessary.

The decoding unit 126 generates bit map data, decoding an image object which is obtained by the image data obtaining unit 103. In the case where the image data is not coded, the process of the decoding unit 126 is omitted.

The image processing unit 122 executes an image processing for the bit map data which is outputted from the decoding unit 126. For example, in the case where the data is coded by the JPEG, a block distortion may occur. Thus, the process for reducing the distortion is executed.

The color space changing unit 123, for the bit map data which the image processing has been executed to, based on the already detected color space information, changes the color space of the obtained printing content into the optimum color space for the printer. In general, the color space for an ink-jet printer, a laser printer and the like is the "CMYK color space".

The printing content which is used according to the second embodiment will be explained as following.

FIG. 11 is a diagram showing an example of the structure of the printing content which is used according to the second embodiment. A file 710 which is described in the XHTML-Print format, as shown in FIG. 11A, is a head file of the printing content, and the file name is "Honbun. xml". As shown in FIG. 11A, between "tag<head>711" and "tag</head>712", it is defined that the color space of the image data file "sample. jpg" 714 is the "NTSC" 713. The description interpreting unit 121 recognizes the color space of the subject image by interpreting such description as described above. And, the process can be switched.

FIG. 11B is a diagram showing a pattern diagram of the image which is described by the image data which is linked to FIG. 11A. And, the file name is "sample. jpg".

As described above, using the printer according to the second embodiment, the color space of each image data which is included in the printing content is certainly transmitted to the printer via the color space information. Thereby, the conversion of the color space can be certainly executed. Even if image data has various kinds of color spaces, a printed matter which has a color space similar to the color space that a content provider intended can be obtained.

According to the second embodiment, the conversion of the color space is executed after the image processing. However, the similar effects can be obtained even if the order is reverse.

Also, as an example of a content, the example in which the color space information is described in the header part of the image data which is defined in the XHTML-Print format is described. However, the similar effects can be obtained even if another command data is described interlocking with the printing content.

FIG. 12 is an example of the case where the color space information is described in the part other than the header part. As shown in FIG. 12, in the body part of the image file which is defined in the XHTML-Print format, the fact that the color space of the image data file "sample. jpg" 733 is the "NTSC" 734 is defined. In this case as well, the description interpreting unit 121 can recognize the color space of the subject image by interpreting such description as described above. And, the process can be switched.

Furthermore, by indicating the color space information as the attribute of the image object, even in the case where a plurality of image objects which have different color spaces exist in one printing content, an independent image processing (for example, a color correction process) can be executed for each object.

Third Embodiment

According to the second embodiment, the embodiment where the color space information is directly exchanged is explained. According to the third embodiment, the method for estimating a color space and executing an image processing based on the description which indicates the environment where image data in a printing content is generated will be explained.

Figure 13:
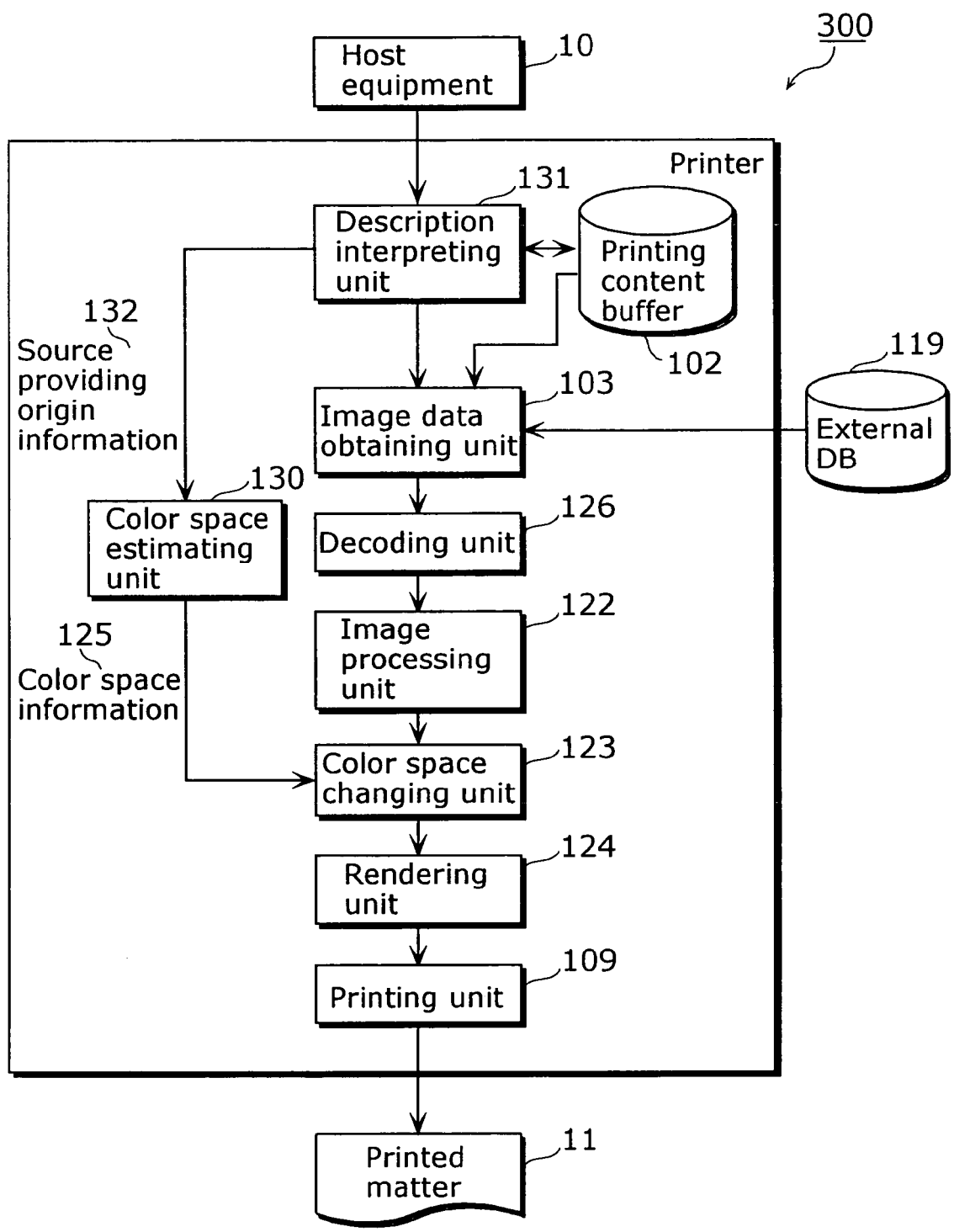
FIG. 13 is a block diagram showing the functional structure of the printer according to the third embodiment.

FIG. 13 is a block diagram showing a functional structure of a printer 300 according to the third embodiment. According to the third embodiment, as well as the first and second embodiments, a printer which prints image data which is described in the XHTML-Print format is assumed.

As shown in FIG. 13, the printer 300 comprises a description interpreting unit 131, a printing content buffer 102, an image data obtaining unit 103, a decoding unit 126, an image processing unit 122, a color space changing unit 123, a rendering unit 124, a printing unit 109 and a color space estimating unit 130. The explanation for the same structures as the first and second embodiments will be simplified below, and the different structures will be mainly explained.

The description interpreting unit 131 includes a CPU, a ROM and the like, and controls the whole printer 300. Moreover, the description interpreting unit 131 detects information which indicates the environment where a printing content is generated (also called "source providing origin information"), and transmits the detected information to the color space estimating unit 130.

The color space estimating unit 130, based on the information received from the description interpreting unit 131, estimates the color space of the environment where the image data is generated, according to the predetermined rules (for example, a corresponding table or a flow chart). For example, in the case where a DSC file is based on the Exif, the color space can be judged as sRGB. Also, in the case where DSC data is not coded, the color space may be the "NTSC". Moreover, in the case where data is captured by a TV and the like, the color space can be estimated as the "NTSC". Thus, due to the notification of the information which indicates the environment where data is generated, the color space of the image can be estimated.

FIG. 14 is an example of a table which is used for estimating the color space of the printing content which is obtained by the color space estimating unit 130. As shown in FIG. 14, in the image file which is included in the printing content, the environment 801 (image generation environment) where the image data is generated and the color space name 802 which is estimated from the image generation environment 801 are associated with each other and defined.

The image data obtaining unit 103 receives an image object which is transmitted from the description interpreting unit 131. In the case where the image data is coded, it is decoded by the decoding unit 126, and bit map data is generated. In the case where the image data is not coded, such process as described above is omitted. An appropriate image processing is executed to the outputted bit map data by the image processing unit 122. For example, in the case where the data is coded by the JPEG, a block distortion may occur. Thus, a process for reducing the distortion is executed. Here, specific explanations for the reducing process will be omitted. The color space changing unit 123 changes the color space of the content into the optimum color space for the printer in reference to the already detected color space information. Data is usually processed by the CMYK space in an ink-jet printer, a laser printer and the like. The data whose color space has been changed is converted into printer output data by the rendering unit 124, and printed by the printing unit 109.

A printing content which is used according to the third embodiment will be explained as following.

Figures 15A, 15B:
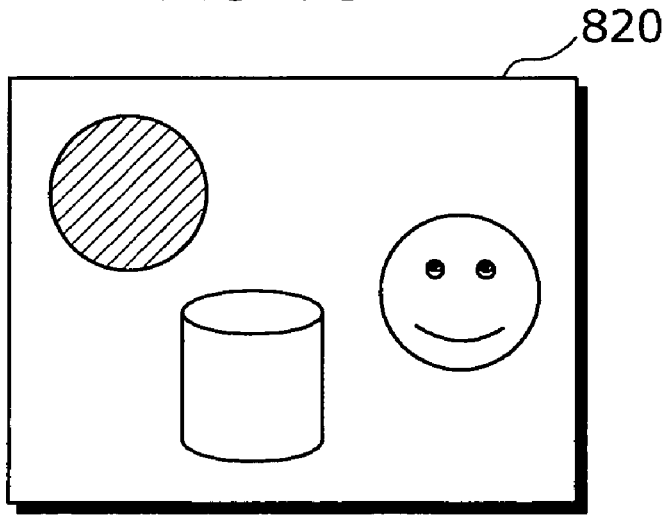
FIG. 15A is a diagram showing an example of the printing content structure according to the third embodiment.
FIG. 15B is an example of the image file which is linked to the file as shown in FIG. 15A.

FIG. 15 is a diagram showing an example of a structure of the printing content which is used according to the third embodiment. A file 810 which is described in the XHTML-Print format, as shown in FIG. 15A, is a head file of the printing content. And, the file name is "Honbun. xml". As shown in FIG. 15A, between "tag<head>811" and "tag</head>812", the fact that the environment where the image data file "sample. jpg" 812 is generated is "DSC" 811 is defined.

Also, FIG. 15B is a diagram showing a pattern of the image which is described by the image data linked to FIG. 15A. And the file name is "sample. jpg".

As described above, by using the printer according to the third embodiment, even in the case where the color space of the image which is included in the obtained printing content is not known, based on the information which indicates where the image object is generated, the color space of the environment where the printing content is generated is estimated. And, according to the estimated color space, the data is converted into the color space of the printer. Thus, a printed matter which has a similar color space to the color space a printing content provider intended can be obtained.

According to the third embodiment, the color space is converted after the image processing. However, even if the order is reversed, and the image processing is executed after the color space conversion, similar effects can be obtained.

Also, as a content example, an example in which the color space information is described in the header part of the image data which is described in the XHTML-Print format is described. However, even if another command data is described interlocking with the printing content, similar effects can be obtained.

Furthermore, as a content example, an example in which the color space information is described in the header part of the XHTML-Print data is described. However, by indicating the data as an attribute of the image object, even in the case where a plurality of image objects which have different color spaces exist in one printing data, an independent image processing (for example, a color correction process) can be executed for each object.

INDUSTRIAL APPLICABILITY

As described above, an image processing apparatus, an image printing apparatus and methods used by these apparatuses are beneficial in the case where printing is executed using various formats of image data such as image data which is generated by an electronic imaging apparatus such as a digital still camera, image data which is displayed by a digital TV and the like and image data which is distributed via a network, and in particular, they are suitable for the case where a content in which a plurality of image data of different formats exists is printed.

The invention claimed is:

1. An image printing apparatus which executes printing based on given image data, the apparatus comprising:
    an image obtaining unit operable to obtain at least one or more image data and information which indicates an apparatus which has generated the image data;
    a color space estimating unit operable to estimate a color space according to the image data based on the information which indicates an apparatus which has generated the image data;
    a color space specifying unit operable to specify a color space according to the image printing apparatus; and
    a color space conversion unit operable to convert the obtained image data so that a definition according to the estimated color space becomes a definition according to the specified color space.

2. The image printing apparatus according to claim 1, wherein the image data is image object data which is linked to a file which is described in a Markup Language (ML) format or image object data which is described in an in-line format in said file, and
    the information about the source apparatus for obtaining the image data is defined as parameters for the image object data.

3. An image printing method for executing printing based on given image data, the method comprising:
    an image obtaining step of obtaining at least one or more image data and information which indicates an apparatus which has generated the image data;
    a color space estimating step of estimating a color space according to the image data based on the information which indicates an apparatus which has generated the image data;
    a color space specifying step of specifying a color space according to the image printing apparatus;
    a color space conversion step of converting the obtained image data so that a definition according to the estimated color space becomes a definition according to the specified color space; and
    a printing step of executing printing in a predetermined printing medium based on the image data to which said color space conversion has been executed.

4. The image printing method according to claim 3, wherein the image data is image object data which is linked to a file which is described in a Markup Language (ML) format or image object data which is described in an in-line format in said file, and
    the information about the source apparatus for obtaining the image data is defined as parameters for the image object data.

* * * * *